Patented Dec. 5, 1939

2,182,075

UNITED STATES PATENT OFFICE 2,182,075

WATER SOLUBLE DERIVATIVES OF P-AMINOBENZENESULPHONAMIDE

Joseph Ebert, Westmont, N. J., assignor to The Farastan Company, Philadelphia, Pa., a corporation of Pennsylvania No Drawing. Original application September 15, 1937, Serial No. 163,915. Divided and this application July 23, 1938, Serial No. 221,007

9 Claims. (Cl. 260—501)

This invention relates to new derivatives of p-amino-benzenesulphonamide. It relates more particularly to salts of p-aminobenzenesulphonamide with aromatic sulphonic acid compounds selected from the group consisting of phenolsulphonic acid, benzenesulphonic acid and sulphosalicylic acid, which salts are readily soluble in water and hence are advantageous in therapeutics for the treatment of various infections caused by cocci.

This application is a division of my copending application, Serial No. 163,915, filed September 15, 1937.

p-Aminobenzenesulphonamide has been recognized as having great value for the treatment of coccus infections; but its use has been subject to serious disadvantages in view of its slight solubility in water, approximately one part of this compound being soluble in 160 parts of water at 25° C. Because of this low solubility, the oral administration of the compound in aqueous solution is impractical, so that the compound is ordinarily administered orally in tablet form. This low solubility is even more objectionable when the compound is used in injection therapy, as it has been found that to obtain therapeutic results, for example, for treating meningococcic infections, as much as 0.08 to 0.24 gram of the substance must be injected intraspinally, requiring the injection of as much as 10 to 30 cc. of liquid. For effective therapeutic results with subcutaneous injection, from 0.8 to 3.2 grams of the material must be injected every twelve hours, requiring the subcutaneous injection of from 100 to 400 cc. of solution. Injections of such large amounts of liquid are impractical and often dangerous.

In accordance with the present invention, derivatives of p-aminobenzenesulphonamide, characterized by ready solubility in water are prepared. The nature of these new salts is such that when administered they readily split to reform the p-aminobenzenesulphonamide and the acid, thus retaining the therapeutic properties of the p-aminobenzenesulphonamide with the attendant advantages due to ready solubility in water, which include oral administration in dissolved form using relatively little water, injection of therapeutic doses without including objectionable quantities of liquid, and improved assimilation and faster circulation.

High solubility in water is one of the important characteristics of the compounds of the invention and I have found it important to use sulphonic acids which form salts with p-aminobenzenesulphonamide having a solubility in water greater than 1 to 20; in other words, a solubility such that one part of the salt is soluble in less than twenty parts of water.

Among the sulphonic acids which I have found to be particularly advantageous for use are the sulphonic acids of benzene, phenol and salicylic acid, that is benzenesulphonic acid, phenolsulphonic and sulphosalicylic acid. Each of these compounds forms a salt with p-aminobenzenesulphonamide having a solubility in water greater than 1 to 20, and containing approximately 40 to 50% of p-aminobenzenesulphonamide, such that therapeutic doses of these salts may be readily administered, either orally or by injection, in aqueous solution without administration of excess or objectionable quantities of liquid.

These compounds, that is, the new salts, also have other valuable properties therapeutically. When administered, the compounds break up to form the p-aminobenzenesulphonamide and the sulphonic acids. The sulphonic acids are eliminated through the urinary tract practically unchanged, that is, in acid form, while the p-aminobenzenesulphonamide is eliminated in the form of its acetyl derivatives, that is, in coupled form. As a result, the acidity of the urine is increased, a factor of great value in the treatment of infections of the genito urinary tract. However, if the solutions are used for injection purposes, they are advantageously buffered with one of the commonly used buffer salts to adjust the pH of their solution from about 7.0 to about 7.4, to avoid irritation. Such buffering materials as disodium acid phosphate and sodium borate may be advantageously used for this purpose. Highly alkaline buffering materials, such as sodium carbonate, should be avoided, as their use might result in the precipitation of the p-aminobenzenesulphonamide.

The invention will be further illustrated by the following specific examples, which describe the preparation of salts which I have found to be of particular value, although it is not limited thereto.

*Example 1.*—The salt of p-aminobenzenesulphonamide with benzenesulphonic acid. 172 parts of p-aminobenzenesulphonamide and 172.5 parts of a 92.5% pure benzenesulphonic acid (or the equivalent amount of a benzenesulphonic acid of higher or lower purity) are mixed in 5000 parts of distilled water or 2500 parts of methanol. The mixture is stirred for several minutes until a complete solution is formed, after which it is set aside for a period of 6 to 12 hours. The solvent is then removed by evaporation, preferably under a vacuum, at low temperature, to insure the production of a compound of high purity. If the evaporation is carried out at atmospheric pressure, a slightly more impure compound is produced. The salt obtained may be purified by recrystallization from alcohol or water advantageously with the use of a decolorizing agent such as activated carbon, filtrol, etc. The crystals obtained melt at 213 to 217° C. with decomposition.

One part of this compound, which contains one molecule of water of crystallization removable by prolonged drying in the vacuum, dissolves in 14 parts of water at 25° C. and contains 49.4% of p-aminobenzenesulphonamide.

Example 2.—The salts of p-aminobenezenesulphonamide with phenolsulphonic acid. 172 parts of p-aminobenzenesulphonamide are mixed with 588 parts of commercially available 30% o-phenolsulphonic acid (or the equivalent amount of o-phenolsulphonic acid of higher or lower purity) in 5000 parts of distilled water, or 2000 parts of methanol, with recovery and purification of the salt obtained as in Example 1. The product melts at 216 to 220° C. with decomposition.

One part of this new compound dissolves in 14 parts of water at 25° C. Analysis shows that it contains about 49.7% of p-aminobenzenesulphonamide, together with a small percentage of p-phenolsulphonic acid.

Example 3.—The salt of p-aminobenzenesulphonamide with sulphosalicylic acid. 172 parts of p-aminobenezenesulphonamide are reacted with 218 parts of anhydrous sulphosalicylic acid in 6500 parts of distilled water or 2500 parts of methanol, with recovery and purification of the salt as in Example 1. The product obtained melts at 214 to 220° C. with decomposition.

One part of the dried compound of this example dissolves in 16 parts of water at 25° C. Analysis shows that it contains 44.1% of p-aminobenzenesulphonamide.

In general, the salts are prepared by reacting the sulphonic acid with the p-aminobenzenesulphonamide in a suitable solvent, such as the water or methanol of the examples, although other solvents, such as ethanol, etc., may be used, as the solvent does not enter into the reaction, and merely enables the neutralization reaction to take place.

I claim:

1. As new compounds, salts of p-aminobenzenesulphonamide with aromatic sulphonic acids selected from the group consisting of phenolsulphonic acid, benzenesulphonic acid and sulphosalicylic acid.

2. The phenolsulphonate of p-aminobenzenesulphonamide.

3. The benzenesulphonate of p-aminobenzenesulphonamide.

4. The sulphosalicylate of p-aminobenzenesulphonamide.

5. The method of preparing water soluble compounds of p-aminobenzenesulphonamide which comprises reacting p-aminobenzene sulphonamide with an aromatic sulphonic acid selected from the group consisting of phenolsulphonic acid, benzenesulphonic acid and sulphosalicylic acid.

6. The method of preparing a water soluble compound of p-aminobenzenesulphonamide which comprises reacting p-aminobenzenesulphonamide with phenolsulphonic acid.

7. The method of preparing a water soluble compound of p-aminobenzenesulphonamide which comprises reacting p-aminobenzenesulphonamide with benzenesulphonic acid.

8. The method of preparing a water soluble compound of p-aminobenzenesulphonamide which comprises reacting p-aminobenzenesulphonamide with sulphosalicylic acid.

9. The method of preparing water soluble compounds of p-aminobenzenesulphonamide which comprises reacting p-aminobenzenesulphonamide with an aromatic sulphonic acid selected from the group consisting of phenolsulphonic acid, benzenesulphonic acid and sulphosalicylic acid in the presence of a solvent.

JOSEPH EBERT.